(12) United States Patent
Pleasant et al.

(10) Patent No.: US 7,940,875 B2
(45) Date of Patent: May 10, 2011

(54) SYSTEM AND METHOD FOR COORDINATING THE ACTIONS OF A PLURALITY OF DEVICES VIA SCHEDULING THE ACTIONS BASED ON SYNCHRONIZED LOCAL CLOCKS

(75) Inventors: Daniel L. Pleasant, Santa Rosa, CA (US); Robert T. Cutler, Everett, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1181 days.

(21) Appl. No.: 10/939,922

(22) Filed: Sep. 13, 2004

(65) Prior Publication Data

US 2006/0056559 A1    Mar. 16, 2006

(51) Int. Cl.
*H04L 7/00* (2006.01)
(52) U.S. Cl. ........................................ 375/356
(58) Field of Classification Search .................. 375/356, 375/357, 358, 359, 365, 366, 369; 370/362, 370/389, 503, 507, 509, 510; 709/224; 713/375, 713/400, 502; 102/206, 210, 214, 215, 217, 102/221, 262, 264
See application file for complete search history.

(56) References Cited

U.S. PATENT DOCUMENTS

| 5,214,236 | A | * | 5/1993 | Murphy et al. ................ 102/217 |
| 5,887,029 | A |  | 3/1999 | Husted et al. |
| 5,987,022 | A |  | 11/1999 | Geiger et al. |
| 6,006,254 | A |  | 12/1999 | Waters et al. |
| 6,161,123 | A |  | 12/2000 | Renouard et al. |
| 6,236,277 | B1 |  | 5/2001 | Esker |
| 6,771,594 | B1 |  | 8/2004 | Upadrasta |
| 2002/0038441 | A1 |  | 3/2002 | Eguchi et al. |
| 2002/0169993 | A1 | * | 11/2002 | Woods et al. ................. 713/400 |
| 2003/0023739 | A1 |  | 1/2003 | Ngoc Vu |
| 2003/0115501 | A1 |  | 6/2003 | Bamford |
| 2004/0039825 | A1 |  | 2/2004 | Bennett |
| 2005/0144309 | A1 | * | 6/2005 | Gish ............................ 709/233 |

FOREIGN PATENT DOCUMENTS

| EP | 1 115 001 A1 | 7/2001 |
| EP | 1 256 858 A2 | 11/2002 |
| GB | 2 387 752 A | 10/2003 |

OTHER PUBLICATIONS

U.S. Appl. No. 10/939,838, filed Sep. 13, 2004, Daniel L. Pleasant et al.

(Continued)

*Primary Examiner* — Sam K Ahn

(57) ABSTRACT

A system and method are provided which coordinate the actions of a plurality of devices via scheduling occurrence of the actions based on synchronized local clocks of the devices. Thus, a plurality of devices are communicatively coupled via a communication network, and the devices have their local clocks synchronized to a high degree of precision, using IEEE 1588, NTP, or some other technique for synchronizing their local clocks. "Time bombs" can be scheduled on the devices to coordinate the occurrence of actions between the devices in accordance with the detonation times set for the respective time bombs. In certain embodiments, not only the detonation time, but also the respective action to be triggered upon detonation is programmable for each device. The time bombs implemented on the various devices can be used to coordinate the operations of the various devices with a high degree of temporal precision.

11 Claims, 5 Drawing Sheets

OTHER PUBLICATIONS

U.S. Appl. No. 10/939,867, filed Sep. 13, 2004, John B. Stratton et al.
U.S. Appl. No. 10/939,921, Sep. 13, 2004, Daniel L. Pleasant et al.
"Ethernet Hits Real-Time . . . Really", Manufacturing. Net, Jim Montague, Dec. 1, 2003, pp. 1-3.

"Synchronizing, Measurement and Control Systems", Sensors Online, Eidson J. C. et al., Nov. 2002, pp. 1-6.
Search Report dated: Nov. 29, 2005.

* cited by examiner

SYSTEM AND METHOD FOR COORDINATING THE ACTIONS OF A PLURALITY OF DEVICES VIA SCHEDULING THE ACTIONS BASED ON SYNCHRONIZED LOCAL CLOCKS

CROSS-REFERENCE TO RELATED APPLICATIONS

This application is related to concurrently filed and commonly assigned U.S. patent applications Ser. No. 10/939,838 entitled "SYSTEM AND METHOD FOR SYNCHRONIZING OPERATIONS OF A PLURALITY OF DEVICES VIA MESSAGES OVER A COMMUNICATION NETWORK", Ser. No. 10/939,921 entitled "SYSTEM AND METHOD FOR ROBUST COMMUNICATION VIA A NON-RELIABLE PROTOCOL", and Ser. No. 10/939,867 entitled "ADD-ON MODULE FOR SYNCHRONIZING OPERATIONS OF A PLURALITY OF DEVICES", the disclosures of which are hereby incorporated herein by reference.

BACKGROUND OF THE INVENTION

Synchronization of the operation of various components of a system is often desired. For instance, in measurement systems that are made up of several traditional all-in-one box instruments, complex measurements often require that several instruments be controlled together in order to properly synchronize their respective operations. As examples, spectrum analyzers should not be allowed to take measurements until signal sources have settled; power meter measurements should not be taken until a sufficient number of samples have been averaged to ensure accuracy; and frequency-sweeping sources should not be allowed to switch to a new frequency until measurements have been completed at the current frequency. Thus, it becomes desirable to synchronize the relative operations of the various instruments.

Often, hardware trigger lines are used to synchronize the various instruments in a test system. Hardware trigger lines are particularly effective in measurement systems where precise synchronization is required, or where measurement speed is important. When implementing hardware trigger lines, the instruments have a trigger output and a trigger input with a dedicated hardware line (e.g., wire) connecting one instrument's trigger output to another instrument's trigger input.

For instance, a spectrum analyzer typically includes a receiver and a digitizer in the same box, wherein the output signal from the receiver should be measured after it has had some period of time in which to settle. When implementing hardware trigger lines between the receiver and the digitizer, the receiver would have a trigger output port that is coupled via a hardware line (e.g., wire) to the digitizer's trigger input port. The voltage on this hardware line goes high at the time that the output signal from the receiver has settled, and the digitizer unit's trigger input senses that voltage transition to high and thus triggers its measurement to begin. Thus, the hardware trigger line ensures that the relative operations of the instruments are synchronized in a desired manner.

The hardware trigger line technique requires a physical wire that goes between these two instruments, and the function of that wire is fixed and dedicated for use as a trigger. Further, inclusion of such hardware trigger lines increases the amount of wiring and thus often results in wiring complexities and/or complications, such as issues concerning routing of the wires and increased difficulty troubleshooting problems. Also, as the length of the hardware trigger line increases (e.g., as the coupled instruments are arranged more distant from each other), the latency of signals communicated over such hardware trigger line also increases.

Another synchronization technique uses software to control the operations of the various instruments in a synchronized manner. Such software synchronization may be used in situations in which hardware triggers are not available, such as when the instruments to be synchronized are arranged too far apart to permit the use of a hardware trigger line. In implementing software for controlling synchronization of the operation of various instruments, the software may utilize predefined time delays, queries of the instruments, and/or software interrupts for coordinating the actions of the instruments. For instance, after instructing a first instruments to take a first action, the software in an external controller may wait for a specific amount of time before instructing another instruments to take a given action that is to be performed after completion of the first action. In some cases, the software in the external controller may query an instrument to determine when it has completed a given function so that the software can determine when it is appropriate to trigger the next action. In certain instances, the instruments may be implemented to send a signal to the external controller to generate a software interrupt in the controller indicating, for example, that a given instrument has completed a certain operation.

As an example of utilizing a software synchronization technique in synchronizing the operations of the above-mentioned receiver and digitizer, a controlling computer may send a message to the receiver instructing it to change frequency. It is known that some amount of wait time is needed before triggering measurement of the signal having the changed frequency (to allow the change in the frequency to settle). So, after instructing the receiver to change its frequency, the controlling computer waits (or "sleeps") for some predefined amount of time, such as 100 milliseconds. The controlling computer then instructs the digitizer to start making a measurement.

Techniques are also known for synchronizing the clocks of networked devices to a high-degree of precision. As one example, Network Time Protocol (NTP) is a protocol that is used to synchronize computer clock times in a network of computers. In common with similar protocols, NTP uses Coordinated Universal Time (UTC) to synchronize computer clock times to within a millisecond, and sometimes to within a fraction of a millisecond. As another example, the Institute of Electrical and Electronics Engineers Standards Association (IEEE-SA) has approved a new standard for maintaining the synchrony between clocks on a network, referred to as the IEEE 1588 "Standard for a Precision Synchronization Protocol for Networked Measurement and Control Systems." In general, this IEEE 1588 standard defines messages that can be used to exchange timing information between the networked devices for maintaining their clocks synchronized. The IEEE 1588 standard enables even a greater degree of precision (e.g., to within a microsecond) in clock synchronization than that provided by NTP.

However, while techniques such as NTP and the IEEE 1588 standard provide techniques for synchronizing the clocks of networked devices to a high-degree of precision such that the networked devices that each have a local clock have a common sense of time, these techniques do not address synchronization of the operation of devices. Rather, such techniques focus on actively maintaining synchronized clocks between networked devices. Thus, the active clock synchronization techniques leave open how the devices may leverage their synchronized clocks, if at all, in order to synchronize their respective operations.

BRIEF SUMMARY OF THE INVENTION

The present invention is directed to a system and method which coordinate the actions of a plurality of devices via scheduling occurrence of the actions based on synchronized local clocks of the devices. Thus, a plurality of devices are communicatively coupled via a communication network, and the devices have their local clocks synchronized to a high degree of precision, using IEEE 1588, NTP, or some other technique for synchronizing their local clocks. "Time bombs" can be scheduled on the devices to coordinate the occurrence of actions between the devices in accordance with the detonation times set for the respective time bombs. In this regard, the "time bombs" detonate at a programmed time, which may be an absolute time (e.g., 1:00:00) or may be a relative time (e.g., 2 seconds after occurrence of some event), and their detonation triggers a certain action on the respective device. In certain embodiments, not only the detonation time, but also the respective action to be triggered upon detonation is programmable for each device. As described further herein, the time bombs implemented on the various devices can be used to coordinate the operations of the various devices with a high degree of temporal precision. Further, in certain embodiments, the time bombs may be used in combination with event messages that the devices are operable to communicate across a communication network for coordinating their respective operations.

For instance, according to at least one embodiment, a system comprises at least two devices that are communicatively coupled via a communication network, wherein the at least two devices include means for synchronizing their clocks. The means for synchronizing their clocks, according to various embodiments provided herein, synchronizes the local clocks of the devices by, for example, exchanging messages between the devices. Such synchronized clocks may be implemented according to the IEEE 1588 standard or the NTP standard, as examples. The at least two devices each further comprise a means for coordinating their respective operations, wherein the coordinating means comprises a means for scheduling an action to occur at a specified time. For example, the means for coordinating may be an event manager, wherein the event manager is programmable for setting a scheduled action to occur at a specified time, and wherein the event manager is operable to trigger its corresponding device to perform the scheduled action at the specified time in accordance with the corresponding device's synchronized clock The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE EMBODIMENTS

Figure 1:
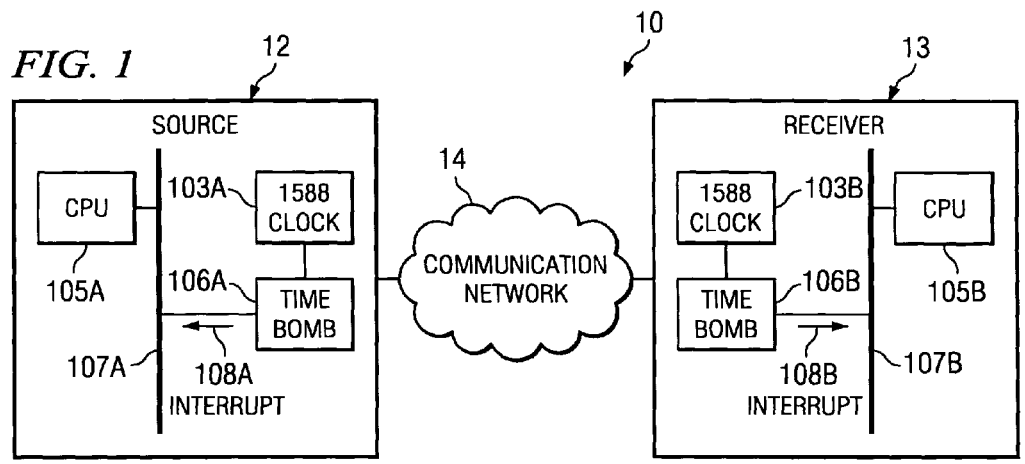
FIG. 1 shows an example system shown according to one embodiment for coordinating operations of a plurality of networked devices.

As described above, measurement systems often require that the operation of several instruments be synchronized (or coordinated) in an appropriate manner to allow for accurate measurements to be obtained. For instance, a spectrum analyzer should be coordinated to make its measurements after a signal source has had sufficient opportunity to settle at its output frequency. All or a portion of a measurement system may be formed with "synthetic instruments." Synthetic instruments are not able to complete measurements by themselves, but instead a collection of them must work together to implement a measurement. On the other hand, traditional all-in-one box instruments (referred to herein as "fully contained instruments") fully contain all sub-systems needed for making a desired measurement. For instance, a spectrum analyzer may be implemented as a fully contained instrument, or such spectrum analyzer may be formed by a collection of synthetic instruments, such as a receiver, digitizer, etc., that are communicatively coupled via a communication network. A fully contained system may need to interface with some other system in order to have something to measure. for instance, a fully contained spectrum analyzer interfaces with a source to measure the signal provided by the source Whether using a plurality of fully contained instruments (e.g., spectrum analyzer, RF source, etc.), or a plurality of synthetic instruments (or a combination of fully contained and synthetic instruments), the relative operations of the various instruments is often desired to be coordinated in some manner to allow for accurate measurements.

Within the traditional fully contained instruments, various subsystems can accomplish timing and synchronization functions via hardware trigger lines and/or their underlying firmware. Synthetic instruments, which are functional pieces of the fully contained instruments, may need to be synchronized in some other way because, for example, such synthetic instruments may be arranged too far apart for use of hardware trigger lines to be practical and/or the wiring complexities involved with implementing such hardware trigger lines may render that solution undesirable. Additionally, the requirements for synchronization of synthetic instruments are often more stringent than for synchronization between separate fully contained instruments because of the fact that each synthetic instrument (or "module") contains a smaller set of functionality.

Referring again to the above-mentioned example of a spectrum analyzer, modern fully contained spectrum analyzers typically include a receiver and a digitizer. The spectrum analyzer's firmware controls the frequency sweep of the receiver as well as the digitizer, and it can easily synchronize the digitizer with the receiver frequency to ensure that measurements are taken correctly. A synthetic instrument system, on the other hand, might include a receiver and a digitizer, but not in the same instrument. Synchronization between these devices is therefore not contained within a single instrument. In this synthetic instrument system, synchronization of the digitizer with the receiver frequency is desired to ensure that the digitizer takes measurements at the time that the receiver frequency is settled, and not sooner or later than that. Techniques are provided herein that may be used for synchronizing the operations of a plurality of synthetic instruments and/or fully contained instruments.

Turning to FIG. 1, an example system 10 is shown according to one embodiment for coordinating operations of a plurality of networked devices (or "instruments"). The example system 10 includes a source 12 and receiver 13 that are communicatively coupled via a communication network 14, which may be a local area network (LAN), the Internet or other wide area network (WAN), public switched telephony network (PSTN), wireless network, any combination of the foregoing and/or any other network now known or later developed for communicating information from at least one device to at least one other device. While a source 12 and a receiver 13 are shown in this example, it will be understood that embodiments for synchronizing operations described herein are not limited in application to these exemplary instruments. The techniques described herein may be employed for synchronizing the operations of any instruments that form a measurement system. Such techniques may be employed for synchronizing the operations of synthetic instruments of a measurement system and/or fully contained instruments. Further, while the techniques have particular applicability to measurement systems, in order to synchronize to a high-degree of precision the operations of various instruments that are used for making measurements, the techniques described herein may be likewise employed in other types of systems in which synchronization of operations of a plurality of networked devices is desired.

Source 12 includes CPU 105A, and receiver 13 includes CPU 105B. Further, source 12 and receiver 13 have local clocks that are synchronized in this example. In this specific example, IEEE 1588 is used, wherein source 12 implements IEEE 1588 clock 103A and receiver 13 implements IEEE 1588 clock 103B. Of course, other techniques for actively synchronizing the local clocks, such as using NTP, may be employed in other implementations. The local clocks are referred to as being "actively synchronized" because the devices interact with each other to maintain their respective local clocks synchronized in accordance with the particular synchronization technique employed (e.g., IEEE 1588 or NTP). Other techniques (e.g., passive techniques) may be employed in alternative embodiments for synchronizing the local clocks, using GPS (global positioning system) receivers, etc. Thus, source 12 and receiver 13 have their local clocks 103A and 103B synchronized to a high-degree of precision such that they have a common sense of time.

In the example of FIG. 1, a "time bomb" is implemented on each of source 12 and receiver 13. Specifically, time bomb 106A is implemented on source 12, and time bomb 106B is implemented on receiver 13. The time bombs allow the instruments to be programmed to take an action(s) (e.g., execute instructions) at pre-defined times, which are referred to as detonation times. The detonation times may be absolute times, such as 1:00:00, or the detonation times may be defined as relative times, such as 10 seconds after the occurrence of a particular event. As an example, time bomb 106A may be programmed on source 12 to detonate at 1:00:00 and trigger source 12 to change its frequency. Assuming that it is known that it takes 1 second for the frequency to settle at its changed value on source 12, time bomb 106B may be programmed on receiver 13 to detonate at 1:00:01 and trigger receiver 13 to measure the frequency. In this regard, the measurement action performed by receiver 13 is coordinated with the changing of frequency by source 12 to ensure that the measurement is taken after the frequency has settled at the changed value. Further, because of the high-degree of precision between the local clocks 103A and 103B, the respective actions of the source and receiver can be scheduled in an efficient manner (e.g., without requiring unnecessarily large amount of time delays between their respective operations).

In this example, the detonation of time bomb 106A on source 12 generates an interrupt 108A over bus 107A to interrupt CPU 105A and trigger it to perform the corresponding action (such as change the frequency in the above example). Similarly, the detonation of time bomb 106B on receiver 13 generates an interrupt 108B over bus 107B to interrupt CPU 105B and trigger it to perform the corresponding action (such as taking a measurement in the above example).

Figure 2:
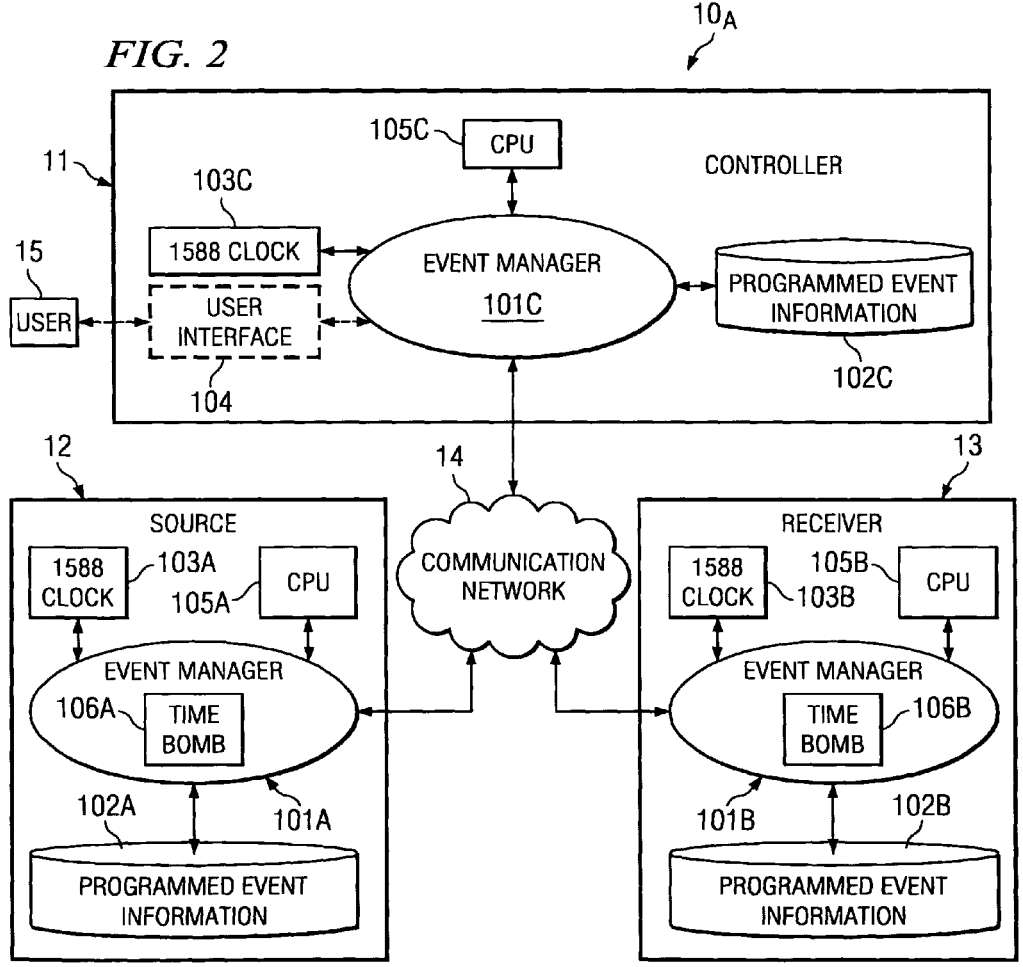
FIG. 2 shows an example measurement system in which a controller is used for programming time bombs on a source and receiver.

In certain embodiments, the detonation times and the corresponding actions to be taken by each device is programmable. Turning to FIG. 2, an example measurement system is shown in which a controller is used for programming the time bombs on source 12 and receiver 13. The example system $10_A$ of FIG. 2 includes controller 11 that is communicatively coupled to source 12 and receiver 13 via communication network 14. Controller 11, which may be a personal computer (PC) or other processor-based device, includes a central processing unit (CPU) 105C. Further, controller 11 has its local clock 103C synchronized with the local clocks of source 12 and receiver 13 in this example (e.g., via IEEE 1588). However, in certain embodiments controller 11 need not have its local clock synchronized with the clocks of the other instruments in the measurement system, such as source 12 and receiver 13.

Source 12, receiver 13, and controller 11 each have an event manager executing thereon, labeled 101A, 101B, and 101C, respectively. In general, the event manager is software and/or hardware that is designed to allow the various instruments to communicate information about time-sensitive events. Operation of the event manager according to this example embodiment is described further below. As shown, event manager 101A of source 12 manages the implementation of time bomb 106A, and event manager 106B of receiver 13 manages the implementation of time bomb 106B. For instance, event manager 101A can receive information (e.g., from controller 11) to program the detonation time and corresponding action to trigger upon detonation of time bomb 106A.

Before proceeding further with the discussion of the example system 10$_A$ of FIG. 2, it is helpful to briefly discuss some of the terminology that will be used herein.

The term "event", when used alone, refers to something that happens internally in an instrument, such as within source 12 or within receiver 13 of the example system 10$_A$. For example, an event could be generated when the input buffer of a digitizer fills up, or when an output signal has settled. Another example of an "event" is detonation of a time bomb on an instrument. Events are usually generated by the instrument's hardware, although that is not a restriction. Software can generate events also.

The term "event message" refers to a message sent on the communication network that is used to notify other instruments that an event has occurred. In certain embodiments provided herein, event messages are broadcast using, for example, User Datagram Protocol (UDP), to all of the instruments on a given communication network (e.g., on a given subnet). In other embodiments, the event messages are sent via a point-to-point protocol, such as Transmission Control Protocol (TCP). Any instrument can send an event message. Other instruments can either respond to event messages or ignore them.

The term "output event" refers to an event that results in an event message being communicated on the communication network. Note that not all events are output events. An instrument may handle some events internally. Detonation of a time bomb may be an output event if the instrument on which the time bomb detonates is programmed to communicate an event message responsive to such detonation.

The term "input event" refers to an event that is received from another instrument. The input event arrives in the form of an event message on the communication network.

The term "action" refers to something that an instrument does in response to either an event or an event message. In certain embodiments provided herein, actions are executed by means of callback routines. In this context, an action is not an atomic event, e.g., a callback routine can execute a complex sequence of instructions.

The term "programming message" refers to a message sent on the communication network that is used to program a recipient device to take a certain action responsive to detection of a certain event. For instance, a programming message may be used to program a time bomb on an instrument, which may include setting the detonation time and specifying the action(s) for the instrument to take upon detonation of the time bomb.

In accordance with embodiments described herein, time bombs are used for coordinating at least some of the actions of instruments, such as source 12 and receiver 13. Further, in certain embodiments, event messages can be sent over the communication network 14 to aid in coordinating certain operations of the instruments, such as source 12 and receiver 13. Thus, rather than requiring hardware trigger lines between all of the instruments used in a measurement system, at least certain instruments are synchronized using the time bombs and/or event messages described herein. According to at least one embodiment, the event messages include identification of an event, as well as a corresponding timestamp. An example of implementing such event messages and using them for coordinating operations of networked devices is described further in concurrently filed and commonly assigned U.S. patent application Ser. No. 10/939,838 titled "SYSTEM AND METHOD FOR SYNCHRONIZING OPERATIONS OF A PLURALITY OF DEVICES VIA MESSAGES OVER A COMMUNICATION NETWORK", the disclosure of which is incorporated herein by reference.

The instruments can be configured/programmed to take particular action upon receiving a given event, which may be either an event received internally or an event included in an event message (an "input event"). As further described herein, in certain embodiments the actions are dynamically programmable. For instance, controller 11 may send a programming message to source 12 instructing its event manager 101B to take a particular action upon detection of a specific event. In certain embodiments, source 12 may be pre-configured to take the desired action responsive to a given event, rather than being dynamically programmed in this manner.

In the example embodiment of FIG. 1, source 12, receiver 13, and controller 11 each include programmed event information, labeled 102A, 102B, and 102C, respectively. Such programmed event information may, for example, specify the action(s) that the corresponding instrument is configured to take responsive to specified events. For instance, such programmed event information may identify the action(s) that an instrument is to take upon detonation of a given time bomb. The programmed event information may, for example, be arranged as a database or stored in any other suitable manner. In certain embodiments, a user interface 104 is provided on controller 11 to enable a user 15 to interact with event manager 101A to, for example, program the event information on the various instruments. For instance, user 15 may interact with event manager 101A to set a detonation time for a time bomb on source 12 and specify the corresponding action(s) for source 12 to take responsive to the detonation. In certain implementations, the user 15 may specify an event (e.g., Event No. 1) for the time bomb to trigger upon its detonation, and the user can program the instrument to take certain action(s) responsive to detection of the event (e.g., responsive to "Event No. 1" change frequency). In certain implementations, the user 15 may instead specify instructions for the time bomb to execute upon its detonation. For instance, the user may communicate a programming message from controller 11 to source 12 that specifies a detonation time to be set for time bomb 106A, as well as instructions (e.g., software code) for the source to execute upon detonation.

Examples of programmed event information 102A-102C are described further herein, including the specific example provided in Table 2 below.

Because the local clocks of the instruments are synchronized to a high degree of precision, the actions of the various networked instruments can be coordinated with such high degree of precision.

Figure 3:
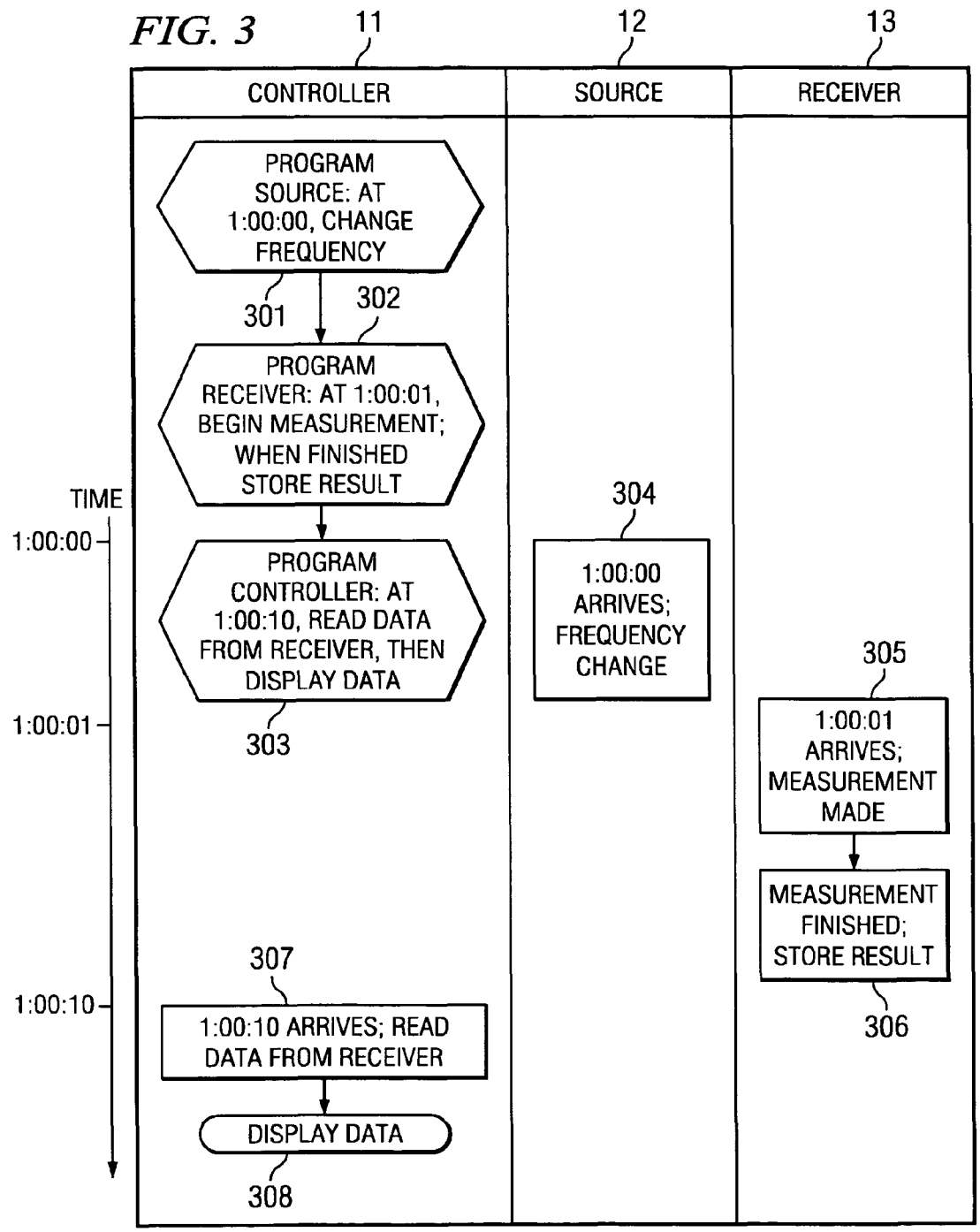
FIG. 3 shows a first example of using a time-based scheduling technique in the system of FIG. 2 for coordinating the operations of the networked instruments.

Turning to FIG. 3, a first example of using a time-based scheduling technique in system 10$_A$ (of FIG. 2) for coordinating the operations of the networked instruments is shown. In the example of FIG. 3, controller 11 is used to program source 12 in operational block 301. For instance, user 15 may interact with user interface 104 to specify certain information according to which source 12 is to be programmed. In this example, source 12 is programmed to change its frequency at 1:00:00. Thus, this information is received (via a programming message) by source 12 from controller 11 and stored to its programmed event information 102A. As mentioned above, scheduling an event to occur at an absolute time or at some relative time (e.g., a time specified in relation to some other time, such as "10 seconds from the timestamp included in an event message that identified Event X") in this manner may be referred to as setting a "time bomb" that has an absolute or relative detonation time, wherein upon detonation of such time bomb the corresponding device for which the time bomb was set (source 12 in this example) takes some programmed action (changing its frequency in this example).

Controller 11 is used to program receiver 13 in operational block 302. For instance, user 15 may interact with user interface 104 to specify certain information according to which receiver 13 is to be programmed. In this example, receiver 13 is programmed to make a measurement of the frequency of source 12 at 1:00:01 and store the result. Thus, this information is received by receiver 13 from controller 11 and stored to its programmed event information 102B.

Further, in this example, controller 11 itself is programmed, in block 303, to set a time bomb that detonates at 1:00:10 and triggers controller 11 to read the measurement data from receiver 11 and display such measurement data. Accordingly, information may be stored to programmed event information 102C of controller 11 for programming such time bomb.

At 1:00:00, the time bomb set on source 12 detonates, thus causing source 12 to change its frequency, which is shown as operational block 304 in FIG. 3. At 1:00:01 the time bomb set on receiver 13 detonates, thus causing receiver 13 to measure the frequency of source 12 (according to the action programmed in block 302), in operational block 305. In operational block 306, receiver 13 stores the result of its measurement.

At 1:00:10, the time bomb set on controller 11 detonates, thus causing controller 11 to read the measurement data from receiver 13 (in operational block 307) and display such data (in operational block 308). Thus, controller 11 reads the measurement data from receiver 13. For instance, the measurement data captured by receiver 13 at 1:00:01 may be stored to a certain memory address in receiver 13, and the controller 11 may read that certain memory address of the receiver in block 307. Then, in block 308, controller 11 displays the read measurement data.

In the above example, because of the synchronized local clocks of the instruments, controller 11 can be assured that it is displaying the appropriate measurement data. For instance, assuming it is known that no more than 1 second is required for the changed frequency to settle on source 12, then the measurement by receiver 13 at 1:00:01 after source 12 changes its frequency at 1:00:00 will result in an accurate measurement. Further, controller 11 can be assured that it is displaying the measurement data that was captured at 1:00:01, even though controller 11 does not read and display the measurement data until 1:00:10 in this example.

Of course, application of the embodiments provided herein for synchronizing the operations of devices is not limited to the specific example of FIG. 3. For instance, while FIG. 3 uses absolute times for synchronizing operations (e.g., source 12 changes its frequency at 1:00:00, receiver 13 makes its measurement at 1:00:01, and controller 11 reads and displays the measurement data at 1:00:10), time bombs may be set to detonate at relative times. An example of using such relative times is provided in the operational flow of FIG. 4.

Figure 4:
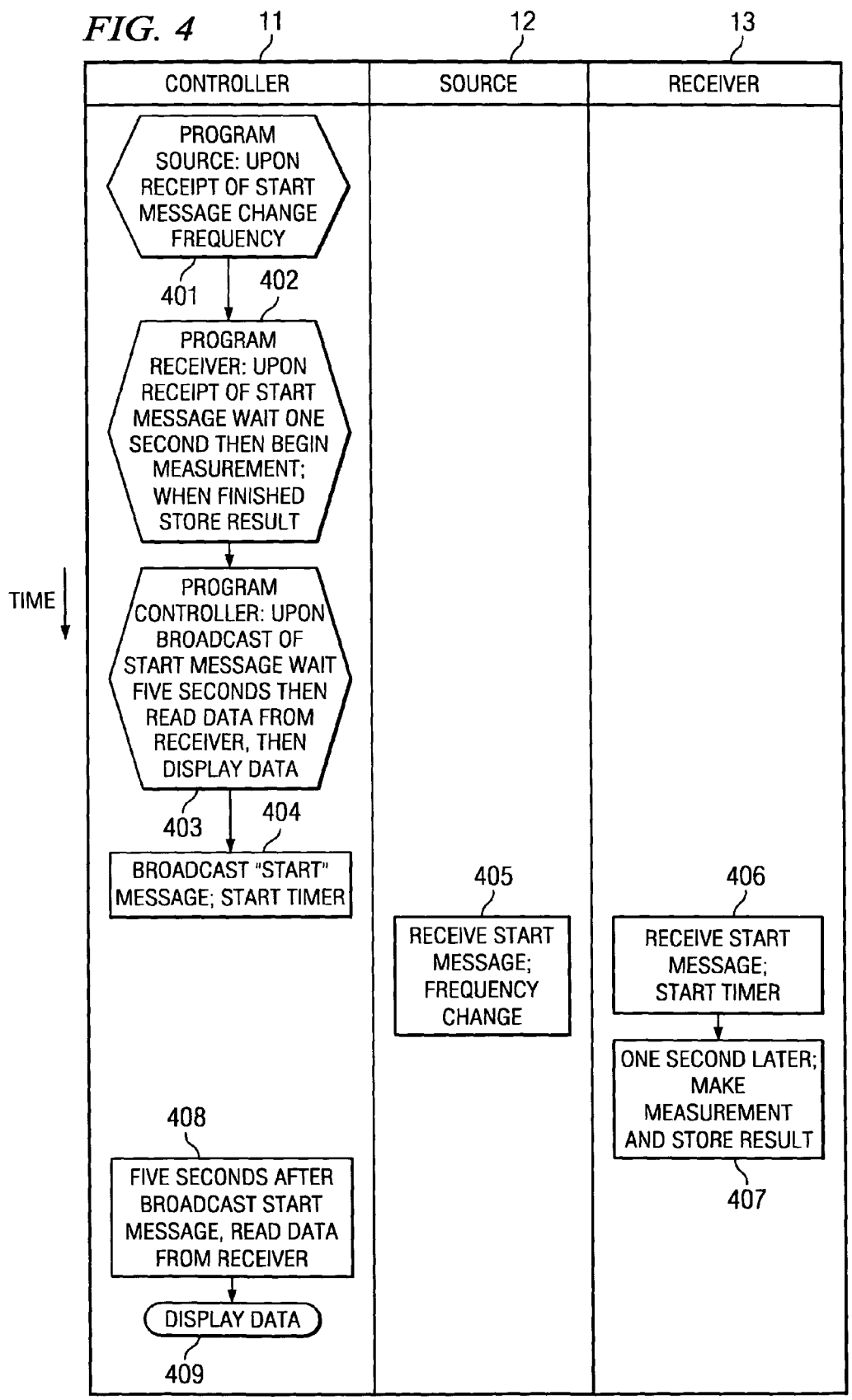
FIG. 4 shows another example of using a time-based scheduling technique in the system of FIG. 2 for coordinating the operations of the networked instruments.

Thus, FIG. 4 shows another example of using a time-based scheduling technique in system $10_A$ (of FIG. 2) for coordinating the operations of the networked instruments. In the example of FIG. 4, controller 11 is used to program source 12 in operational block 401. For instance, user 15 may interact with user interface 104 to specify certain information according to which source 12 is to be programmed. In this example, source 12 is programmed to change its frequency upon receipt of a start message. Such "start message" is an event message that identifies a "start" event. Thus, this information is received (via a programming message) by source 12 from controller 11 and stored to its programmed event information 102A. Rather than triggering the change in frequency to occur immediately upon receipt of the start message, source 12 could be programmed to change its frequency at some desired interval of time after the receipt of the start message, such as at 2 seconds after the receipt of the start message. As another example, the start message could include a timestamp (based on the synchronized clocks) corresponding to the time at which the message was sent, and the source 12 could be programmed to change its frequency at some desired interval of time after the timestamp included in the start message, such as at 2 seconds after the timestamp included in the start message.

Controller 11 is used to program receiver 13 in operational block 402. For instance, user 15 may interact with user interface 104 to specify certain information according to which receiver 13 is to be programmed. In this example, receiver 13 is programmed to make a measurement of the frequency of source 12 at 1 second following the receipt of a start message. Thus, a time bomb is set on receiver 13 to detonate at 1 second after the receipt of a start message. Of course, rather than triggering the measurement to occur based on the time that receiver 13 receives a start message, the start message may include a timestamp (based on the synchronized clocks) corresponding to the time at which the message was sent, and the receiver 13 could be programmed to change its frequency at some desired interval of time after the timestamp included in the start message. The programmed information is received by receiver 13 from controller 11 and stored to its programmed event information 102B.

Further, in this example, controller 11 itself is programmed, in block 403, to set a time bomb that detonates 5 seconds after broadcasting a start message and triggers controller 11 to read measurement data from receiver 13 and display the data. Accordingly, information may be stored to programmed event information 102C of controller 11 for programming such time bomb.

In operational block 404, controller 11 broadcasts a "start" message to source 12 and receiver 13 via communication network 14 (e.g., using User Datagram Protocol (UDP)). This broadcasting of the start message triggers the timer for the relative-time time bomb that was set for controller 11 in block 403 to start its countdown. Source 12 receives (via its event manager 101A) the start message in block 405, thus causing source 12 to change its frequency. Likewise, receiver 13 receives (via its event manager 101B) the start message in block 406, which triggers the timer for the relative-time time bomb that was set for receiver 13 in block 402 to start its countdown. One second later, the relative-time time bomb on receiver 13 detonates, in block 407, thus causing receiver 13 to make its measurement of the frequency of source 12 and store the result. In this example, it is assumed that the network latencies on network 14 are negligible such that source 12 and receiver 13 receive the broadcast start message substantially simultaneously. That is, any network latencies that exist are assumed in this example to be substantially the same for source 12 and receiver 13 such that they each receive the start message at the same time. Of course, if the network latencies were a larger concern, receiver 13 could be programmed to wait a longer period than 1 after receiving the start message before beginning its measurement to ensure that source 12 has had sufficient time to receive the message and make its frequency change.

Alternatively, as mentioned above, the actions of source 12 and receiver 13 could be programmed to be taken based on a timestamp included in the start message, thereby rendering any network latencies of no consequence. For instance, the broadcast start message may be timestamped at the time that it was sent (e.g., 1:00:00), and the source 12 may be programmed to change its frequency at 2 seconds after the timestamp included in the start message. Assuming that the network latencies are not such that the receiver is unable to receive the start message within 2 seconds of it being broadcast, then the source 12 changes its frequency based on a relative time to the time at which the start message was sent. Because the receiver 12 and controller 11 have synchronized local clocks, the time at which the change in frequency occurs has a high degree of precision. Similarly, the receiver 13 can be programmed to make its measurement at 3 seconds of the timestamp included in the start message (to allow 1 second for the changed frequency to settle).

Returning to the specific example shown in FIG. 4, 5 seconds after controller 11 broadcasts the start message, its time bomb detonates, thus causing controller 11 to read the measurement data from receiver 13 (in operational block 408) and display such data (in operational block 409). Thus, controller 11 reads the measurement data from receiver 13. For instance, the measurement data captured by receiver 13 in operational block 407 may be stored to a certain memory address in receiver 13, and the controller 11 may read that certain memory address of the receiver in block 408. Then, in block 409, controller 11 displays the read measurement data.

Accordingly, as the example of FIG. 4 illustrates, time bombs may be set to detonate based on relative times, such as a time relative to the occurrence of some event (such as receipt of an event message that identifies a particular event, etc.). In certain embodiments, time bombs may be used in combination with event messages for coordinating the operations of instruments in a measurement system.

Figure 5:
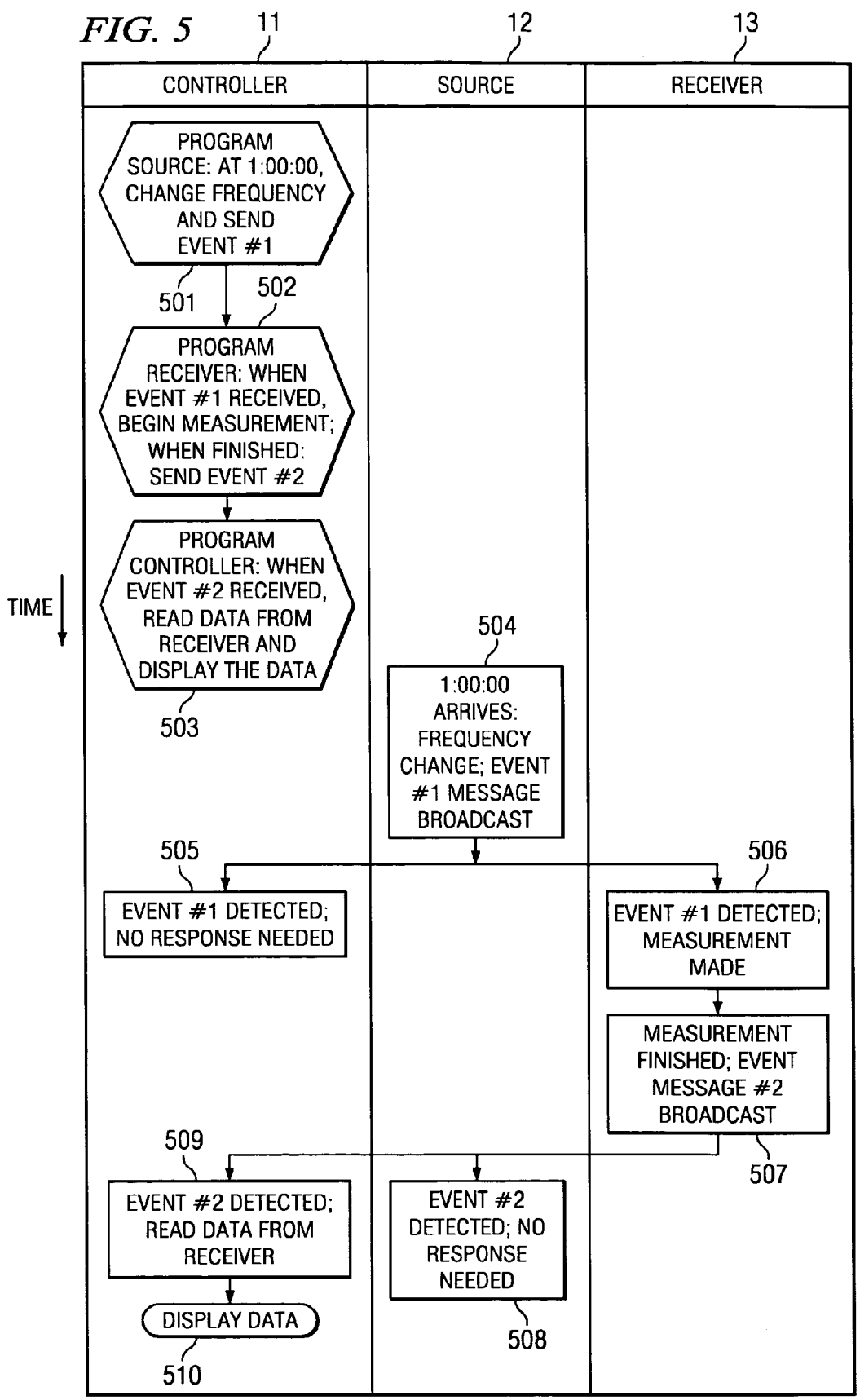
FIG. 5 shows a specific example of using a combination of a time-based technique and message-based technique in the system of FIG. 2 for coordinating the operations of the networked instruments.

Turning to FIG. 5, a specific example of using a combination of a time-based technique and message-based technique in system $10_A$ (of FIG. 2) for coordinating the operations of the networked instruments is shown. In the example of FIG. 5, controller 11 is used to program source 12 in operational block 501. For instance, user 15 may interact with user interface 104 to specify certain information according to which source 12 is to be programmed. In this example, source 12 is programmed to change its frequency at 1:00:00 and then broadcast an event message that identifies Event #1. Thus, this information is received (via a programming message) by source 12 from controller 11 and stored to its programmed event information 102A. This effectively sets a time bomb that is scheduled to detonate at 1:00:00 on source 12.

Controller 11 is used to program receiver 13 in operational block 502. For instance, user 15 may interact with user interface 104 to specify certain information according to which receiver 13 is to be programmed. In this example, receiver 13 is programmed to make a measurement when Event #1 is detected and then broadcast an event message that identifies Event #2. Thus, this information is received by receiver 13 from controller 11 and stored to its programmed event information 102B.

Further, in this example, controller 11 itself is programmed, in block 503, to detect certain events and take responsive actions. For instance, user 15 may interact with user interface 104 to specify certain information according to which controller 11 is to be programmed. In this example, controller 11 is programmed to read measurement data from receiver 13 when Event #2 is detected and then display the read data. Thus, this information is received by controller 11 and stored to its programmed event information 102C.

At 1:00:00, the time bomb set on source 12 detonates, thus causing source 12 to change its frequency and then generate an event message that identifies Event #1, which is shown as operational block 504 in FIG. 5. As mentioned above, the event message also includes a corresponding timestamp based on the local clock 103A of source 12. In this example, source 12 broadcasts the event message over the communication network 14, using UDP or some other suitable multicast protocol. Techniques that may be employed in certain embodiments for using an "unreliable" protocol, such as UDP, in a manner that increases its reliability, such as may be desired when the messages communicated in this manner are relied upon for coordinating operations between networked instruments, are described further in concurrently filed and commonly assigned U.S. patent application Ser. No. 10/939,921 titled "SYSTEM AND METHOD FOR ROBUST COMMUNICATION VIA A NON-RELIABLE PROTOCOL", the disclosure of which is incorporated herein by reference.

Thus, event manager 101A of source 12 broadcasts an event message that identifies Event #1 and that includes a corresponding timestamp based on the local clock 103A of source 12. For instance, the timestamp may be time 1:00:01, which corresponds to the time at which the changed frequency settled. It should be understood that source 12 could be programmed to send the message at the time that it begins changing its frequency and the timestamp included in the event message may therefore correspond to the time that the source begins the frequency change, in which case the receiver 13 may be programmed to take its measurement at some delayed time relative to the included timestamp to allow for the frequency to settle. In this manner, the event message can be en route to the receiver while the frequency change is occurring on the source, which may lead to improved efficiency in the measurement.

The broadcast Event #1 is detected by the event manager 101C of controller 11, and in operational block 505, such event manager 101C of controller 11 determines that no responsive action is needed by controller 11. That is, controller 11 has not been programmed to take any responsive action to a received Event #1, and thus event manager 101C ignores the event message that was broadcast by source 12.

Similarly, the broadcast Event #1 is detected by the event manager 101B of receiver 13. Because receiver 13 is programmed (see operational block 502) to make a measurement upon receiving Event #1, in operational block 506, event manager 101B of receiver 13 causes such responsive action to be taken by receiver 13. Receiver 13 may be programmed to make its measurement at the timestamp included in the event message (wherein the receiver 13 may retrieve a buffered measurement that it made at such timestamp), or receiver 13 may be programmed to make its measurement at a programmed time interval from the timestamp included in the event message, as examples.

Just as receiver 13 was programmed to do in block 502, in operational block 507, receiver 13 broadcasts an event message that identifies Event #2 and that includes a corresponding timestamp based on its local clock 103B. The broadcast Event #2 is detected by the event manager 101A of source 12, and in operational block 508, such event manager 101A of source 12 determines that no responsive action is needed by source 12. That is, source 12 has not been programmed to take any responsive action to a received Event #2, and thus event manager 101A ignores the event message broadcast by receiver 13.

The broadcast Event #2 message is also detected by the event manager 101C of controller 11. Because controller 11 is programmed (see operational block 503) to read the measurement data from receiver 13 and display such data upon receiving Event #2, in operational block 509, event manager 101A of controller 11 causes such responsive action to be taken by controller 11. Thus, controller 11 reads the measurement data from receiver 13. For instance, the measurement data captured by receiver 13 in accordance with the timestamp of the event message that receiver 13 received from source 12 may be stored to a certain memory address in receiver 13, and the controller 11 may read that certain memory address of the receiver in block 509. As another example, the event message generated by receiver 13 may include a timestamp at which its measurement was made (e.g., either the same timestamp included in the event message that was sent from source 12 to receiver 13, or a timestamp that is a certain interval from the timestamp included in the event message that was sent from source 12 to receiver 13), and controller 11 may query receiver 13 for its measurement corresponding to the timestamp at which such measurement was made in block 509. Then, in block 510, controller 11 displays the read measurement data.

In the above example, controller 11 will not receive the event message that identifies Event #2 until some time after the measurement is made by receiver 13, and controller 11 will not read and display such measurement data until an even later time. However, because of the use of the timestamps of the synchronized clocks in the event messages, controller 11 can be assured that it is displaying the appropriate measurement data. For instance, if the receiver 13 made its measurement at 1:00:01, controller 11 can be assured that it is displaying the measurement data that was captured at 1:00:01, event though controller 11 may not receive and display the measurement data until 1:00:05, for example.

Of course, application of the embodiments provided herein for synchronizing the operations of devices are not limited to the specific examples of FIGS. 3-5 provided above.

A specific implementation of an event manager, such as the event manager 101A-101C shown in system 10$_A$ of FIG. 2, is described in further detail below, but embodiments are not intended to be limited to this specific implementation. In this illustrative implementation, the event manager is in many ways analogous to a network service daemon like an FTP server or a Web server—it waits for inputs and then acts on them. In such implementation, the event manager is a listen-only network server when handling inputs, but its implementation differs for output events. This illustrative implementation of the event manager may be thought of as a collection of threads, although it should not be assumed that the event manager will actually be implemented using a threaded model (this depends on the operating system). The illustrative implementation can be modeled as a collection of threads that are all waiting for some type of input. Each thread goes to sleep until its input buffer has data available.

Input events arrive on the communication network. The event manager simply waits for event messages to arrive, in exactly the fashion that any other network server would. When an event message arrives, the event manager wakes up and examines the data packet. If the data packet contains an Event ID (described further below) that the instrument has been programmed to respond to, the event manager calls the corresponding callback routine.

Output events are generated internally. Often, output events (e.g. time bombs) are the result of hardware interrupts. In this case an interrupt service routine (ISR) is installed for use on the instrument. The ISR will be responsible for capturing a time stamp for the event, storing the data, and waking up the event manager, which then executes the appropriate callback routine. The ISR is not the same as the callback routine.

There are several data types that are used in this illustrative example of an event manager. A first data type is Time. The event manager has two different time-based data types. One for absolute time (TimeStamp), and another for time intervals (TimeInterval).

Another data type is Function ID ("FID"). The FID is a value (e.g., a 16-bit integer) that represents some internal functionality of an instrument. It may be implemented as an instrument-specific number that is used to identify various functions that are intrinsic to the instrument.

Instrument functions are classified as "inputs" or "outputs". In this nomenclature, an "output" function is something that happens internally on the instrument and thereby causes an event message to be sent to other instruments. An "input" function is one that the instrument can execute in response to an event message from elsewhere. A time bomb is a special version of an output function for which specific API operations exist (e.g., to set the detonation time). These functions correspond closely to the definitions of "input events" and "output events". Strictly speaking, an "input event" is an event that would result in the execution of an "input function".

In this example implementation, every instrument has a table of FID values and their descriptions, as in the example provided in table 1 below:

TABLE 1

|  | Description |
|---|---|
| Output FID Values | |
| 001 | Source settled |
| 002 | Event 1 out |
| 003 | Event 2 out |
| 004 | Trigger out |
| 005 | Time bomb 1 |
| 006 | Time bomb 2 |
| 007 | Time bomb 3 |
| Input FID Values | |
| 0080 | Step Frequency by 1 MHz |
| 009 | Patt Trig In |

It should be noted that some of these functions can also have a corresponding hardware trigger (either a trigger input or a trigger output).

A user can programmatically extend the Function ID table for a given instrument. When an instrument needs to be programmed to respond to an external event, for example, a new internal function can be added to the table.

Another data type is Event ID ("EID"). The EID is a user-defined value (e.g., a 16-bit integer) that is included in a broadcast event message to identify an event. On input of an event message, and instrument will read the EID to determine if it should respond to it or not (e.g., to determine whether the identified event is one which the instrument has been configured/programmed to take some responsive action). On output, the instrument will add the EID to the event message packet so that other instruments can identify the source of the event.

In general, this allows the user to define EID values that are used with FID values. For instance, an instrument may experience a "time bomb" event, and the FID for that event is "3" (and is hard-coded into the instrument). But if an event message is broadcast as a result of this event, the EID value is user-definable, and does not have to be the same as the FID.

Each individual instrument may pre-define default EIDs for most of the FIDs. But the system integrator/end user can set/change the EID values for any of the FIDs as may be desired.

The user may, for example, specify EIDs that are unique to each instrument in a test system. Otherwise, problems may be encountered whenever a test system includes multiple identical instruments. For a given test system, the user may also specify unique EIDs for each instrument's events.

A Function ID to Event ID map is provided in this example implementation. That is, the event manager subsystem in each instrument maintains a FID to EID map. This may be implemented as a table, for example. This table maintains the mapping between EIDs and FIDs, and also includes other data, such as:
(a) A flag for disabling/enabling each function.
(b) The (address of) the callback function that is used for the event.
(c) Information as to whether or not the event in question is an input or an output. While time bombs are output events, they may be flagged specially in the table because they have specific API functions associated with them.
(d) A timeout value. This is used for input events and represents the maximum delay that can be tolerated before an event message is received.

An example of such a table for an instrument is provided in Table 2 below:

TABLE 2

| Function ID | Description | Event ID | Enable/ Disable | Input/Output/ Time Bomb | Callback function | Timeout |
|---|---|---|---|---|---|---|
| 001 | Source settled | 23012 | Y | Output | xxx | N/A |
| 002 | Event 1 out | 23013 | Y | Output | yyy | N/A |
| 003 | Event 2 out | 23014 | N | Output | zzz | N/A |
| 004 | Time Bomb | 23015 | N | Time Bomb | . . . | N/A |
| 101 | Trigger In | 55013 | Y | Input | . . . | 123.456 |
| 101 | Alt. Trigger | 55014 | Y | Input | . . . | 12.3456 |
| 102 | Dump data | 66013 | N | Input | . . . | 1.23456 |
| 103 | Shutdown | 66014 | N | Input | . . . | 12.3456 |
| 104 | Use programmed | 66015 | N | Input | . . . | 123.456 |

A given FID in the table represents either an input or an output, but not both. A time bomb is a special type of output function. Table 2 provides an example of information that may be stored to the programmed event information 102A of source 12. The programmed event information 102B and 102C of receiver 13 and controller 11 may be arranged similarly.

The enable/disable setting of Table 2 reduces unnecessary traffic over the communication network for output events, and is used to identify relevant event messages for input events. By default the individual instrument may set the state of the enable/disable flag for all functions (most will be disabled) and set default EIDs for each function. It is possible to specify (and enable) multiple EIDs for a given FID. This enables the event manager to execute the same function if any of the EIDs is received.

Various API functions are provided in this illustrative implementation. One API function that is provided is MapFIDtoEID(FID, EID). This function maps a given FID to an EID. This function does nothing and returns an error if a user tried to map from an FID that does not exist.

UnMapFIDtoEID(FID, EID) is an API function that unmaps a given FID from an EID. This returns the mapping to the default state and also disables the event (see EnableEvent below). This functionality is similar to the EnableEvent call (below), but it is used in cases where multiple EIDs are mapped into a single FID and only one of the EIDs is to be unmapped. This function does nothing and returns an error if the given FID/EID pair cannot be found.

EnableEvent(FID, EID, true/false) is an API function that enables or disables an event using FID or EID or both. If the function is an input, it subscribes/unsubscribes to all occurrences of it; and if the function is an output, it enables/disables all occurrences of the output. If a zero is specified for either FID or EID, the parameter will be ignored and the other (presumably non-zero) parameter will be used.

If the given FID refers to a time bomb, the function is to be enabled by this function and initialized by a CreateTimeBomb( ) function (see below). This function EnableEvent can be used to disable a time bomb, in which case it does the same thing as the CancelTimeBomb( ) call. This EnableEvent function does nothing and returns an error if the FID/EID pair cannot be found.

SendEvent(EID, TimeStamp, Data, Bytes) is another API function that is provided. This function broadcasts an event message. It is intended to be called from within callback routines, and shouldn't be called if the function is disabled, although this will not cause an error.

CreateTimeBomb(FID, TimeStamp, RepeatCount, TimeInterval) is another API function that is provided. This function will set a repeated time bomb that will start from the given time stamp, then it will repeat for RepeatCount−1 times using the given time interval (so the total number of detonations is RepeatCount). The RepeatCount can be set to −1 for infinite looping. Every time the time bomb expires the CallBackFn is called for execution.

CreateTimeBomb(FID, TimeStamp, Frequency) is another function, which is a special version of the above function. This function creates a repeated time bomb with repeat_count=−1. The time interval is calculated from the frequency parameter.

Another API function provided is CancelTimeBomb(FID). This function will try to cancel a time bomb. There is no guarantee that the time bomb will be cancelled before it fires. In some cases the CallbackFn may handle this with internal flags. This CancelTimeBomb function does the same thing as EnableEvent( ) when EnableEvent( ) is used to disable a time bomb function. The CancelTimeBomb function returns an error and does nothing if the given FID does not have any time bombs set, or if the FID is not a time bomb to begin with.

GetFunctionMap( ) is a function that will return the information that is contained in the FID-to-EID map (defined above). This function may be used for debugging purposes, for example.

The event manager includes a network daemon that listens for commands on the communication network and makes appropriate API calls on the instrument's local processor. This functionality enables a (remote) host computer to program an instrument for measurement-specific tasks. The controlling computer may, for instance, program an instrument to start a measurement when a certain event message is received. To do that, it sends a programming command to the instrument.

As described above, the event manager also listens for broadcast event messages from other instruments. This means that the event manager of this example implementation includes two network listeners: one to listen for event messages from other instruments (which listens on a multicast UDP port), and one to listen for remote programming commands (which listens on a TCP port).

The network daemon simply listens on a TCP port for commands. Each command may be accompanied by additional data. Note that the allowed commands correspond to the API functions that are described above.

While an illustrative implementation of an event manager is described in detail above, embodiments are not limited to that example implementation. Rather, various features and implementation details provided above may be changed in alternative embodiments. For example, in certain embodiments TCP may be used for sending event messages, rather than broadcasting event messages via UDP. Also, the various example API functions provided in the example event manager described above may change, all or some of such functions may not be provided, and/or additional functions may be provided in alternative event manager implementations.

Figure 6:
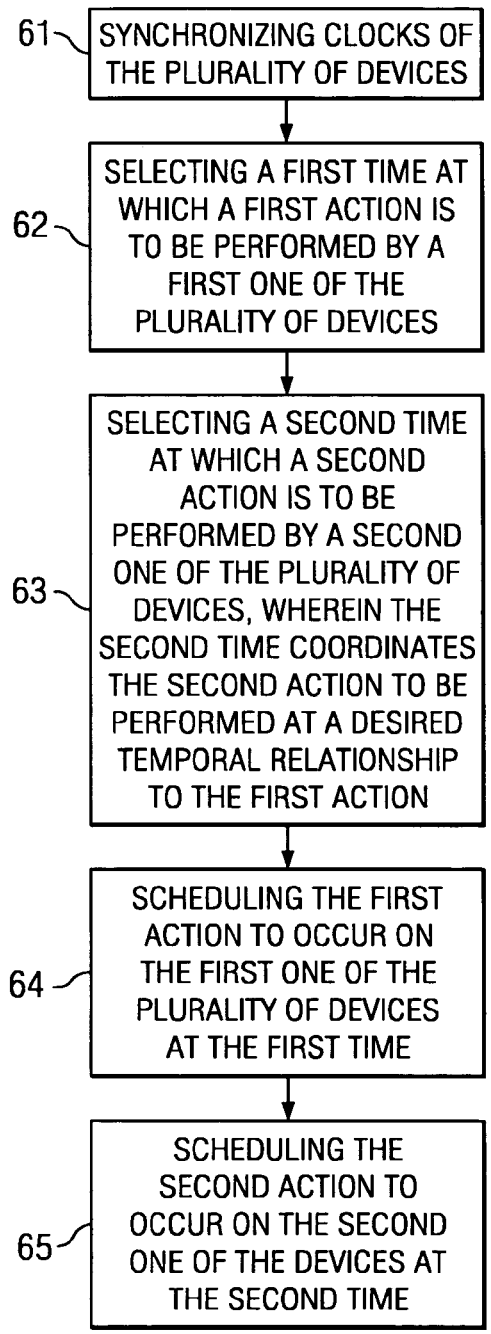
FIG. 6 shows an operational flow diagram for synchronizing the operation of a plurality of networked devices based at least in part on a time-based technique according to one embodiment.

Turning now to FIG. 6, an operational flow diagram for synchronizing the operation of a plurality of networked devices based at least in part on a time-based technique according to one embodiment is shown. In operational block 61, the local clocks of a plurality of devices are synchronized. As described above, such local clocks may be synchronized to a high-degree of precision using a synchronization technique, such as IEEE 1588, NTP, or GPS, as examples. In operational block 62, a first time at which a first action is to be performed by a first one of the plurality of devices is selected. As described above, such "first time" may be an absolute time or it may be relative time.

In operational block 63, a second time is selected at which a second action is to be performed by a second one of the plurality of devices. Again, such "second time" may be an absolute time or it may be a relative time. The second time is selected such that it coordinates the second action to be performed at a desired temporal relationship to the first action. In operational block 64, the first action is scheduled to occur on the first one of the plurality of devices at the first time. For instance, a time bomb can be set on the first device to detonate at the first time and thereby trigger the first action on the first device. In operational block 65, the second action is scheduled to occur on the second one of the plurality of devices at the second time. For instance, a time bomb can be set on the second device to detonate at the second time and thereby trigger the second action on the second device. Such implementation of the time bombs on the first and second devices in this manner enables their respective first and second actions to be temporally coordinated in the manner desired. Thus, as described above, the first and second devices may be distributed across a communication network, and their respective operations can be coordinated with a high-degree of precision using the time-based scheduling technique provided herein (either alone or in combination with a message-based scheduling technique).

Figure 7:
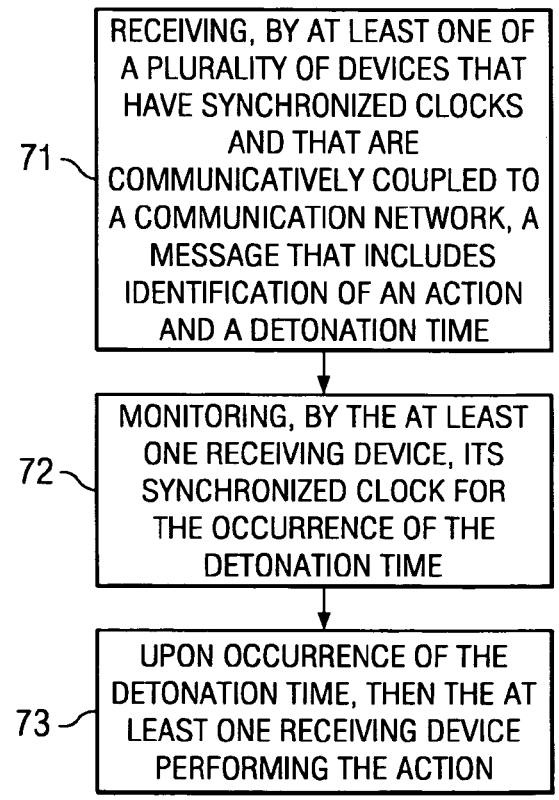
FIG. 7 shows an example operational flow diagram for synchronizing the operation of a plurality of networked devices based at least in part on a programmable time-based technique.

As mentioned above, the specific detonation times and responsive actions to be taken upon detonation are programmable in certain embodiments. Thus, FIG. 7 shows an example operational flow diagram for synchronizing the operation of a plurality of networked devices based at least in part on a programmable time-based technique. In operational block 71, a message is received by at least one of a plurality of devices, wherein the message includes identification of an action and a detonation time. The message may be received, for example, from a controller (such as controller 11). The action identified in the message may be a plurality of actions. Further, the action identified may include instructions for the at least one device to execute upon the detonation time and/or an event to be triggered on the at least one device. The detonation time may be an absolute time or a relative time. The plurality of networked devices are communicatively coupled to a communication network and have synchronized clocks. As described above, their local clocks may be synchronized to a high-degree of precision using a synchronization technique, such as IEEE 1588, NTP, or GPS, as examples.

In operational block 72, the at least one device monitors its synchronized clock for the occurrence of the detonation time. According to various embodiments, the monitoring of the synchronized clock for the occurrence of a detonation time may be performed by hardware logic and/or software logic. For instance, in one implementation, upon the event manager receiving a message that sets a detonation time for a time bomb, the event manager stores the detonation time in a hardware register. Hardware logic is included that compares the detonation time in the hardware register with the current time of the IEEE 1588 local clock, and when the local clock's time equals the detonation time, it generates an interrupt to the CPU. The interrupt service routine (ISR) will cause the event manager to trigger the corresponding action that is to be taken by the device upon detonation of the time bomb. Alternatively, the 1588 local clock could be implemented to generate an interrupt on each clock cycle, and the event manager may compare the current time of the local clock with the received detonation time. However, this alternative technique of using the software to monitor the local clock for the received detonation time is not as efficient as monitoring the clock for the detonation time in the hardware logic.

Upon occurrence of the detonation time, the at least one receiving device performs the action in operational block 73. Thus, as described above, the desired action can be programmed to occur on the at least one device at a desired time (either absolute time or relative time), and because the devices have their local clocks synchronized, the action can be programmed to occur on the device at a desired coordination relative to occurrence of other actions on the other devices.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
  a plurality of instruments that are communicatively coupled via a communication network, wherein the plurality of instruments have synchronized clocks; and at least one of the plurality of instruments comprises logic for a programmable time bomb that is operable to receive a detonation time and a corresponding action to trigger upon said detonation time, wherein said programmable time bomb logic triggers the corresponding action on said least one of the plurality of instruments upon the synchronized clock of said at least one of the plurality of instruments reaching said detonation time.

2. The system of claim 1 wherein the synchronized clocks are synchronized via one selected from the group consisting of: IEEE 1588 and Network Time Protocol (NTP).

3. The system of claim 1 wherein the corresponding action comprises taking a measurement.

4. A method comprising:
receiving, by at least one of a plurality of instruments that have synchronized clocks and that are communicatively coupled to a communication network, a message that includes identification of an action and a detonation time;
monitoring, by the at least one of the plurality of instruments, its synchronized clock for the occurrence of the detonation time; and upon occurrence of the detonation time, then the at least one of the plurality of instruments performing said action.

5. The method of claim 4 wherein said action comprises taking a measurement.

6. The method of claim 4 wherein said synchronized clocks are synchronized using one selected from the group consisting of: IEEE 1588 and Network Time Protocol (NTP).

7. The method of claim 4 wherein said detonation time comprises an absolute time.

8. The method of claim 4 wherein said detonation time comprises a relative time.

9. A system comprising:
a plurality of devices that are communicatively coupled via a communication network, wherein the plurality of devices have synchronized clocks, at least one of the plurality of devices comprising:
an interface for receiving input that programs the at least one of the plurality of devices to take a defined action at a scheduled time; and an event manager operable to monitor the synchronized clock of the at least one of the plurality of devices for occurrence of the scheduled time, the event manager being operable to trigger the at least one of the plurality of devices to take the defined action at the scheduled time, wherein the event manager comprises: hardware logic operable to compare the synchronized clock of the at least one of the plurality of devices with the scheduled time and generate an interrupt upon the synchronized clock of the at least one of the plurality of devices reaching the scheduled time; and software operable to compare the synchronized clock of the at least one of the plurality of devices with the scheduled time.

10. The system of claim 9 wherein the synchronized clocks are synchronized via one selected from the group consisting of: IEEE 1588 and Network Time Protocol (NTP).

11. The system of claim 9 wherein the defined action comprises taking a measurement.

* * * * *